United States Patent
Adler

(10) Patent No.: US 10,405,661 B2
(45) Date of Patent: Sep. 10, 2019

(54) DETECTION OF THE OCCUPATION OF A HAIR SALON CHAIR BY A PERSON

(71) Applicant: La Hair Consulting Group GmbH, Essen (DE)

(72) Inventor: Lisandro Adler, Essen (DE)

(73) Assignee: LA HAIR CONSULTING GROUP GMBH, Essen (DE)

( * ) Notice: Subject to any disclaimer, the term of this patent is extended or adjusted under 35 U.S.C. 154(b) by 0 days.

(21) Appl. No.: 15/573,579

(22) PCT Filed: Apr. 29, 2016

(86) PCT No.: PCT/DE2016/100197
§ 371 (c)(1),
(2) Date: Nov. 13, 2017

(87) PCT Pub. No.: WO2016/180399
PCT Pub. Date: Nov. 17, 2016

(65) Prior Publication Data
US 2018/0140097 A1 May 24, 2018

(30) Foreign Application Priority Data
May 13, 2015 (DE) .................... 20 2015 003 745 U

(51) Int. Cl.
| A47C 1/11 | (2006.01) |
| G01L 5/00 | (2006.01) |
| A47C 1/06 | (2006.01) |
| A47C 7/72 | (2006.01) |
| A47C 31/00 | (2006.01) |

(52) U.S. Cl.
CPC ................ *A47C 1/11* (2013.01); *A47C 1/06* (2013.01); *A47C 7/725* (2013.01); *A47C 31/008* (2013.01); *G01L 5/00* (2013.01)

(58) Field of Classification Search
CPC ........... A47C 1/06; A47C 1/11; A47C 31/008; A47C 7/725; G01L 5/00
USPC ....................................... 340/667
See application file for complete search history.

(56) References Cited

U.S. PATENT DOCUMENTS

| 4,372,605 A * | 2/1983 | Cervantes ................ A47C 1/04 297/188.11 |
| 5,954,360 A | 9/1999 | Griggs, III et al. |
| 7,161,490 B2 | 1/2007 | Huiban |
| 7,598,881 B2 | 10/2009 | Morgan |
| 2003/0025601 A1* | 2/2003 | Gruteser ............. A47C 15/004 340/540 |
| 2004/0090093 A1* | 5/2004 | Kamiya ............... B60N 2/5628 297/180.14 |
| 2004/0195876 A1* | 10/2004 | Huiban .................. A47C 9/002 297/217.3 |

(Continued)

FOREIGN PATENT DOCUMENTS

| CN | 204015734 U | * 12/2014 |
| DE | 198 42 946 A1 | 3/2000 |

(Continued)

*Primary Examiner* — Hirdepal Singh
(74) *Attorney, Agent, or Firm* — David S. Safran; Roberts Mlotkowski Safran Cole & Calderon, P.C.

(57) ABSTRACT

A chair (1) having at least one sensor (2) for the qualitative and/or quantitative acquisition of a physical parameter indicating the occupation of the chair (1) by a person. Two methods are provided for assessing a state of occupation of a chair (1).

4 Claims, 2 Drawing Sheets

(56) References Cited

U.S. PATENT DOCUMENTS

| | | | |
|---|---|---|---|
| 2005/0016786 A1 | 1/2005 | Mack et al. | |
| 2008/0094213 A1* | 4/2008 | Morgan | B60R 21/01534 340/552 |
| 2008/0319616 A1* | 12/2008 | Federspiel | B60R 21/01532 701/45 |
| 2010/0305816 A1* | 12/2010 | Orlewski | B60R 21/01516 701/45 |
| 2011/0050442 A1* | 3/2011 | Hefferon | G08B 5/221 340/679 |
| 2011/0143779 A1* | 6/2011 | Rowe | G06Q 30/02 455/456.3 |
| 2015/0015399 A1* | 1/2015 | Gleckler | A61B 5/1116 340/573.7 |
| 2016/0066013 A1* | 3/2016 | Li | H04N 21/2541 725/75 |
| 2016/0183687 A1* | 6/2016 | Hoyt | A47C 31/126 297/217.2 |
| 2017/0041867 A1* | 2/2017 | Itagaki | H04W 52/245 |

FOREIGN PATENT DOCUMENTS

| | | | |
|---|---|---|---|
| DE | 10 2005 048 080 A1 | 4/2007 | |
| DE | 102005048080 A1 * | 4/2007 | ........... G06Q 20/045 |
| DE | 10 2006 030 193 A1 | 1/2008 | |
| DE | 10 2008 018 654 A1 | 10/2009 | |
| DE | 10 2011 113 100 A1 | 3/2013 | |
| JP | 2004-136811 A | 5/2004 | |

\* cited by examiner

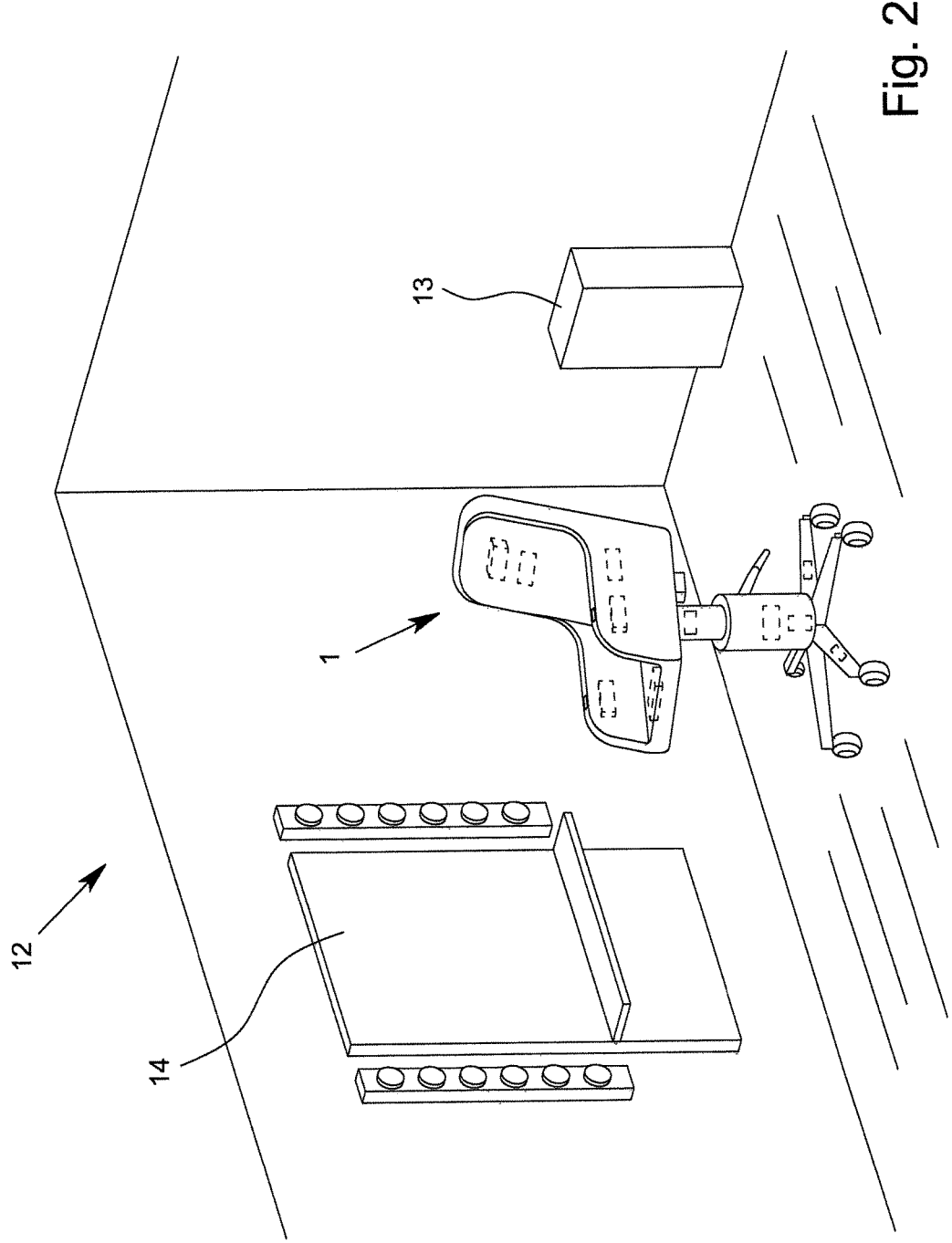

DETECTION OF THE OCCUPATION OF A HAIR SALON CHAIR BY A PERSON

BACKGROUND OF THE INVENTION

Field of the Invention

The present invention relates to various items of seating and lounging furniture, in particular a hair salon chair, two methods for evaluating an occupancy state of the chair, and a hair salon.

Description of Related Art

Seating and lounging furniture of the type in question are furnishing objects and serve to receive a person or a number of people, in particular for sitting, lying, sleeping, and/or resting. Generic seating and lounging furniture are used predominantly in the interior, such as e.g., in rooms for living and commerce. Within the meaning of the present invention, hair salon chairs, television chairs and restaurant chairs are seating furniture and beds are lounging furniture.

Hair salon chairs of the type in question serve to receive a person (generally a customer) during a hair treatment, in particular the treatment of hair on the head, very particularly for the care of the hair on the head and the design of the haircut of the person. Typically, this treatment is performed by a hair treatment expert, in particular a hairdresser or barber, a male or female hairstylist or the like. The treatment of the hair on the head of a person includes, inter alia, cutting, drying, coloring, toning, styling and attaching hair extensions. However, hair salon chairs are also used, in part, for treating eyebrows, eyelashes and/or a beard. In part, such salon chairs are also used for washing the hair on the head at a hair salon washing space.

A hair salon chair of the type in question usually is able to swivel, incline and/or move, in particular roll. Usually, the hair salon chair has a seat with a seating area, a backrest, two lateral armrests and a base part. By way of example, the base part can have a vertical column and a cruciform base with rollers.

It is typical for a hair salon chair that it is height adjustable, even while the person to be treated occupies, in particular sits on, the hair salon chair. A height adjustment is often realized by means of a hydraulic lifting apparatus. Naturally, the lifting apparatus also facilitates the lowering of the hair salon chair. A hydraulic lifting apparatus is usually adjusted by means of a lever, with the lever usually being actuated by a foot.

A generic hair salon chair is known from U.S. Pat. No. 4,372,605 A and German Patent Application DE 10 2008 018 654 A1. The known hair salon chairs have a seat, a backrest, two lateral armrests, a base part and a mechanically or electrically driven lifting apparatus for height adjustment of the hair salon chair.

Typically, hair salon chairs of the type in question find use in a hair salon. In the surroundings of a hair salon chair, in particular in a hair salon having a hair salon chair, there are numerous processes which, depending on whether or not a person occupies the hair salon chair (i.e., sits thereon), can or must be designed differently.

By way of example, it is desirable, as a matter of principle, to emit light with a low color temperature (so-called "warm light") in a hair salon in order to create a comfortable and pleasant atmosphere. However, warm light is unsuitable during the treatment of the hair on the head of a person since it does not reflect the typical daylight conditions (usually with a high color temperature, i.e., "cold light") and consequently may lead to a falsified subjective impression. Consequently, it is advantageous to control the light emitted in the close vicinity of the hair salon chair in such a way that, when a person (a customer) sits on the hair salon chair, there is a change from warm light, which is emitted as a matter of principle, to cold light. Preferably, this color temperature change is effectuated automatically.

It is also desirable only to switch on light sources in the close vicinity of the hair salon chair when a customer occupies the hair salon chair and to switch them off again when the customer stands up again. In this way, it is possible to obtain significant energy savings.

In order to be able to configure processes that depend on the occupancy of the hair salon chair as comfortably and as efficiently as possible, it is advantageous if the occupation of the hair salon chair is captured automatically and if these processes are carried out automatically depending on the occupancy state.

SUMMARY OF THE INVENTION

Therefore, it is an object of the present invention to specify a hair salon chair and a hair salon which allow processes whose configuration depends on the occupancy of a hair salon chair by a person to be carried out automatically.

According to a first aspect of the invention, the problem illustrated above is solved by the hair salon chair as described herein.

It is self-evident that configurations, embodiments, advantages and the like, which are only explained for one aspect of the invention for the purposes of avoiding repetition, apply accordingly in relation to the remaining aspects of the invention.

Having stated that, the present invention is described in more detail below.

The basic concept of the first aspect of the invention comprises equipping the hair salon chair with at least one sensor for qualitative and/or quantitative capture of a physical measurand indicating occupancy of the hair salon chair by a person. A suitable physical measurand is represented by, e.g., pressure caused by the person on the hair salon chair, a temperature change caused by the person, the distance of the person from the hair salon chair, a pulse rate of the person, a respiratory rate of the person, and a change in a light beam caused by the person.

A change in a light beam caused by the person can be captured, for example, by means of a photoelectric sensor having a photodetector, such as a photodiode, a phototransistor or a photoresistor.

The hair salon chair according to the invention facilitates an automated capture of the occupancy of the hair salon chair by a person. In particular, it is possible to ascertain in an automated manner when a person sits down on the hair salon chair, or stands up from the hair salon chair again, with the aid of the hair salon chair according to the invention.

The measurement data of the sensor can be evaluated in an automated manner with the aid of, e.g., electronics circuits and said measurement data can be supplied to a controller or to data processing. In this way, processes that are dependent on the occupancy of the hair salon chair can be carried out in an automated manner.

Preferably, the sensor of the hair salon chair is embodied as a piezoelectric pressure sensor. Piezoelectric pressure sensors are based on the piezoelectric effect and known from the prior art. Such sensors capture changes in the pressure exerted on the sensors, wherein electrical charges are produced on account of the pressure change.

It is advantageous if the piezoelectric pressure sensor is embodied for the qualitative capture of a change in pressure, caused by the person, on the hair salon chair. It is possible, using such a sensor, to capture when a person occupies the hair salon chair, in particular sits down on the hair salon chair, and when a person stands up from the hair salon chair.

According to a preferred configuration of the hair salon chair, the sensor is integrated into the hair salon chair, in particular into a seat, a backrest, an armrest and/or a base part of the hair salon chair. Firstly, this configuration is expedient for the function of the sensor. Secondly, this configuration provides a pleasing impression since the sensor is not visible to the person during operation.

The term "seat", as used within the scope of the present invention, denotes the region of the hair salon chair which is at least predominantly destined to serve as a seating opportunity, i.e., which is designed in such a way that a person can sit thereon. The seat can be cushioned and/or one or more cushions and/or pads can be arranged on the seat.

Preferably, the hair salon chair has at least one reading unit which is embodied to read an identifier of a transponder that identifies the person. To this end, a reading unit that corresponds to an RFID transponder is particularly suitable, said reading unit being able to establish coupling to the RFID transponder by means of alternating magnetic fields and/or high-frequency radio waves. Preferably, the reading device is embodied for data processing by means of a micro-program and embodied with middleware with an interface to further electronic circuits.

With the aid of a system made of the reading unit of the hair salon chair and an RFID transponder, it is possible to automatically and contactlessly identify and localize objects and persons. An RFID transponder that corresponds to the reading unit of the hair salon chair can be housed, e.g., in an object handed to the person, such as, e.g., an armband or a form provided to be filled out by the hairdresser or the barber. Then, the RFID transponder can be provided with a predetermined identifier prior to the handover to the person. If the person finally is near the hair salon chair, this identifier can be read and processed further or evaluated with the aid of the reading unit. The read identifier allows, firstly, the identification of the person and, secondly, the localization thereof. This information can be used for person-related processes.

It was found to be advantageous if the hair salon chair is embodied to process a signal that is produced by the sensor and/or the reading unit. These include typical methods of signal processing, such as, e.g., amplifying, converting, encoding and/or packetizing, but also an evaluation. By way of example, a signal processor can be used for such purposes.

The hair salon chair can have a data processing unit which may comprise the aforementioned signal processor. The data processing unit of the hair salon chair is embodied to determine an occupancy state of the hair salon chair on the basis of the signal produced by the sensor, and create an occupancy status signal.

The term "occupancy state", as used within the scope of the present invention, characterizes the state of occupancy of the hair salon chair. In the simplest form, there are exactly two occupancy states, namely the "occupied" occupancy state and the "not occupied" occupancy state, with a transition only being possible from one occupancy state to the other. Additionally, the occupancy state may contain a specification about the time that has elapsed since the last state change. Thus, the occupancy state can take e.g., the value "occupied for 5 minutes". The occupancy state can also comprise more in-depth evaluations, such as, e.g., "only stood up briefly and sat down again".

When creating the occupancy state signal, the data processing unit of the hair salon chair brings the determined occupancy state into signal form. As a consequence, the occupancy status signal transports the occupancy state.

Thus, an output signal originating from the sensor typically is not evaluated directly and not evaluated by the sensor itself for the purposes of determining an occupancy state of the hair salon chair. Instead, there is, initially, signal processing of the output signal of the sensor and a transmission of the processed signal to the data processing unit. The data processing unit evaluates the processed signal and then determines an occupancy state of the hair salon chair on the basis of the signal produced by the sensor. Thereupon, the data processing unit creates an occupancy state signal which can be transmitted to further electronic circuits of the hair salon chair.

However, an occupancy state of the hair salon chair is only optionally determined by the hair salon chair. It is also possible to let this determination of an occupancy state of the hair salon chair be undertaken by an apparatus external to the hair salon chair. In this case, the information in relation to the captured physical measurand, contained in the output signal of the sensor, is transmitted to this apparatus external to the hair salon chair after signal processing.

Preferably, the hair salon chair has at least one transmission unit embodied to receive a signal that has been produced by the sensor and/or the reading unit and processed by the hair salon chair, and/or an occupancy state signal from the data processing unit and to wirelessly transmit a signal.

With the aid of the transmission unit, it is possible to transmit signals wirelessly to a reception unit outside of the hair salon chair without a cable being required between the transmission unit of the hair salon chair and the reception unit outside of the hair salon chair. This ensures the mobility and comfortable handling of the hair salon chair. Moreover, this ensures an improved optical impression.

When transmitting a wireless signal to the reception unit, it should be noted that the reception unit is typically situated at a distance of less than 100 m from the transmission unit of the hair salon chair. The transmission from the transmission unit of the hair salon chair to the reception unit typically occurs within a building, sometimes within a room. A robust and reliable transmission is important, even without a direct line of sight, so that the wireless signal can be received correctly by the reception unit. Accordingly, WPAN and WLAN technologies come into question, in principle, as wireless technologies. Preferably, Bluetooth is used as wireless technology. On account of the energy efficiency, the BLUETOOTH® version 4.0 (low-energy) wireless technology standard is particularly preferred.

Preferably, the transmission unit of the hair salon chair is embodied to wirelessly transmit a signal that is produced by the sensor and processed by the hair salon chair, an occupancy state signal of the data processing unit, an identifier that is read and processed by the reading unit, an address of the hair salon chair, an error code, and/or information about the state of an energy store of the hair salon chair.

With the aid of an error code, it is possible to communicate to the reception unit errors that have occurred in the components of the hair salon chair. Thus, an error code may transport, for example, the information that the sensor of the hair salon chair is defective, that a measurement error has occurred, and/or that the occupancy state is currently undetermined.

The energy store of the hair salon chair can supply power to one, more or all electronic circuits of the hair salon chair, such as, e.g., the reading unit, the data processing unit and the transmission unit. Batteries, which are advantageously rechargeable, preferably are used as an energy store.

The wireless transmission typically is effectuated with the aid of individual data packets, wherein a data packet also may contain only some of the aforementioned information.

Preferably, the hair salon chair has a plurality of sensors, wherein at least two of the sensors are embodied to capture a different physical measurand. Thus, the hair salon chair could have, e.g., three sensors, wherein two sensors are embodied to capture pressure on the hair salon chair caused by the person and one sensor is embodied to capture a change in a light beam caused by the person. In this way, the hair salon chair can capture different physical measurands, which indicate an occupancy of the hair salon chair by a person, and can relate said physical measurands to one another by suitable processing such that an occupancy state of the hair salon chair can be determined more reliably. Then, preferably, the transmission unit of the hair salon chair is embodied to receive a signal that was produced by the respective sensor and processed by the hair salon chair.

In a preferred configuration of the hair salon chair according to the invention, the hair salon chair has at least one remote control for controlling an external apparatus, in particular an apparatus for reproducing image and/or audio data. The external apparatus can be, for example, a television, radio, a DVD player, a Blu-ray player, a computer, a tablet or a games console. With the aid of the remote control, the person occupying the hair salon chair themselves can operate the external apparatus wirelessly.

Further subject matter of the present invention relates to the use of a sensor for a hair salon chair for qualitative and/or quantitative capture of a physical measurand indicating occupancy of the hair salon chair by a person. In particular, the physical measurand can be, in turn, pressure on the hair salon chair caused by the person, a temperature change caused by the person, the distance of the person from the hair salon chair, a pulse rate of the person, a respiratory rate of the person and/or a change in a light beam caused by the person.

In a preferred configuration of the use according to the invention, the sensor is integrated into the hair salon chair and/or the sensor is embodied as a preferably piezoelectric pressure sensor. Advantageously, a signal that is produced by the sensor and processed by the hair salon chair is received and processed further by a transmission unit of the hair salon chair and the further-processed signal is wirelessly transmitted to a reception unit by means of the transmission unit.

Preferably, the sensor has an embodiment as was already explained above, as such, in respect of the hair salon chair according to the invention.

Further subject matter of the present invention relates to a first method for evaluating an occupancy state of a chair, in particular a hair salon chair. The first method according to the invention comprises at least the following method steps:

qualitatively and/or quantitatively capturing a first physical measurand indicating occupancy of the hair salon chair by a person, in particular pressure on the hair salon chair caused by the person, a temperature change caused by the person, the distance between the person and the hair salon chair, a pulse rate of the person, a respiratory rate of the person and/or a change in a light beam caused by the person, by means of at least one first sensor, processing, in particular amplifying, converting, evaluating, encoding and/or packetizing, a signal produced by the first sensor, receiving and further processing of the processed signal by a transmission unit of the hair salon chair, wirelessly transmitting the further processed signal by means of the transmission unit to a reception unit, preferably wherein the further processed signal contains an identifier that identifies the person, an address of the hair salon chair, an error code and/or information about the state of an energy store of the hair salon chair, further processing, in particular amplifying, converting, evaluating, decoding and/or de-packetizing, of the transmitted signal, determining an occupancy state of the hair salon chair on the basis of the further processed signal by means of a data processing unit connected to the reception unit, and evaluating the determined occupancy state.

Thus, in the first method according to the invention, the hair salon chair assumes the capture of a first physical measurand, the processing of the captured signal and the wireless transfer of the processed signal. The occupancy state of the hair salon chair is determined by means of a data processing device outside of the hair salon chair. Consequently, the first method according to the invention facilitates a lower complexity on the part of the hair salon chair.

Further subject matter of the present invention relates to a second method for evaluating an occupancy state of a chair, in particular a hair salon chair. The second method comprises at least the following method steps:

qualitatively and/or quantitatively capturing a first physical measurand indicating occupancy of the hair salon chair by a person, in particular pressure on the hair salon chair caused by the person, a temperature change caused by the person, the distance between the person and the hair salon chair, a pulse rate of the person, a respiratory rate of the person and/or a change in a light beam caused by the person, by means of at least one first sensor, processing, in particular amplifying, converting, evaluating, encoding and/or packetizing, a signal produced by the first sensor, determining an occupancy state of the hair salon chair on the basis of the processed signal and creating an occupancy state signal by means of a data processing unit of the hair salon chair, receiving and further processing of the occupancy state signal by a transmission unit of the hair salon chair, wirelessly transmitting the further processed signal by means of the transmission unit to a reception unit, preferably wherein the further processed signal contains an identifier that identifies a person, an address of the hair salon chair, an error code and/or information about the state of an energy store of the hair salon chair, further processing, in particular amplifying, converting, evaluating, decoding and/or de-packetizing, of the transmitted signal, reading an occupancy state of the hair salon chair from the further processed, transmitted signal, and evaluating the read occupancy state.

According to the second method according to the invention, an occupancy state of the hair salon chair is determined by the hair salon chair, namely by a data processing unit of the hair salon chair. An occupancy state signal is created from the determined occupancy state and said occupancy state signal is processed further and then transmitted wirelessly. The processed signal produced by the sensor optionally can be additionally transmitted to the reception unit as well. However, preferably only the further-processed occupancy state signal is transmitted to the reception unit.

Preferably, the evaluation of the occupancy state according to the first method according to the invention and the second method according to the invention comprises the following processes:

controlling or regulating the illuminance caused by at least one light source, a luminous color or color temperature caused by at least one light source, the wavelength(s) of the light emitted by the at least one light source, a temperature in at least one portion of a space in which the hair salon chair is situated, and/or a ventilation in at least one portion of a space in which the hair salon chair is situated, reproducing information, in particular advertisement, wherein preferably at least some of the information assumes a portion of a mirror, starting or stopping a timer, preferably wherein a report is generated automatically if a threshold is exceeded, determining a utilization of the hair salon chair within a predetermined period of time and/or monitoring a payment process by the person.

Thus, one or more light sources, in particular in the vicinity of the hair salon chair, can be switched on or off by means of the first or second method according to the invention, or the light flux or the luminous intensity of these light sources can be controlled or regulated, to be precise depending on the determined occupancy state of the hair salon chair. The luminous color or color temperature caused by at least one light source also can be changed to warm light or cold light, depending on whether or not the hair salon chair is occupied by a person. A corresponding statement applies to the wavelength(s) of the light emitted by the light source(s), to the temperature in the vicinity of the hair salon chair and to the ventilation in the vicinity of the hair salon chair.

It can also be achieved with the two methods according to the invention that information is displayed, e.g., an advertisement or a television program, as soon as it has been determined that the hair salon chair is occupied by a person and, respectively, this information is no longer displayed as soon as it is determined that the person no longer occupies the hair salon chair. Preferably, at least some of the information can be incorporated into a mirror assigned to the hair salon chair.

If it is determined with the aid of the method according to the invention that the hair salon chair is occupied by a person, the starting or stopping of a timer can be used to offer wares, such as, e.g., a drink, food and a magazine, and/or services, such as, e.g., a massage, depending on the duration of the occupancy by the person.

However, by way of the method according to the invention, it is also possible to inform a team member or an electronic apparatus that a person has stood up from the hair salon chair, whereupon a check can be carried out as to whether the person is undertaking or has undertaken a payment process. Optionally, the person can be reminded to carry out a payment process.

Preferably, the first method according to the invention and the second method according to the invention additionally comprise the following method steps:

identifying the person occupying the hair salon chair by means of a reading unit of the hair salon chair, creating identity information, wirelessly transmitting the identity information to the reception unit by means of the transmission unit of the hair salon chair, reproducing information about the person, in particular about earlier hair salon treatments performed on the person, and, optionally, displaying an image of the person, wherein the image preferably assumes a portion of a mirror.

With the aid of this preferred embodiment of the method according to the invention, it is possible to recall person-related data in respect of earlier hair treatments and, in this way, extend or improve the advice and/or treatment for the person. By displaying an image of the person, it is possible to illustrate, for example, different hairstyles and/or hair colors or tones, and hence a before/after view.

Preferably, both methods according to the invention additionally comprise qualitatively and/or quantitatively capturing a second physical measurand, differing from the first physical measurand and indicating occupancy of the hair salon chair by a person. This can be realized by means of at least one second sensor of the hair salon chair. An occupancy state of the hair salon chair can be determined more reliably with the aid of the measurand captured by the first sensor and the measurand captured by the second sensor. In particular, this can be realized by virtue of the captured measurands from the first sensor and from the second sensor being correlated. Here, the occupancy state of the hair salon chair can be determined outside of the hair salon chair according to the first method according to the invention or by the data processing unit of the hair salon chair according to the second method according to the invention.

It is preferable for the methods according to the invention further to comprise the assignment of the hair salon chair to a mirror on the basis of the transmitted address of the hair salon chair. In this way, the information relating to the hair salon chair and/or the person occupying the hair salon chair can be displayed on the mirror in front of which the hair salon chair is currently situated.

Further subject matter of the present invention relates to a hair salon having at least one hair salon chair as described above and at least one reception unit for receiving wireless signals from the hair salon chair.

Preferably, the hair salon has at least one mirror assigned to the hair salon chair, at least one data processing unit, at least one cash register system and a seat allocation system for allocating a person to the hair salon chair.

The structures and principles explained above can also be transferred to a bed. Typically, such a bed has a bed frame, at least one slatted frame, at least one mattress and at least one mattress topper.

Such a bed has at least one sensor for qualitative and/or quantitative capture of a physical measurand indicating occupancy of the bed by at least one person. Suitable physical measurands are represented by, e.g., pressure on the bed caused by the person(s), a temperature change caused the person(s), the distance of the person(s) from the bed, a pulse frequency of the person(s), a respiratory frequency of the person(s) and/or a change in a light beam caused by the person(s).

The at least one sensor can be embodied as explained above in relation to the hair salon chair according to the invention.

The sensor preferably is integrated into the bed, in particular into a bed frame, a slatted frame, a mattress and/or a mattress topper of the bed.

Further, the bed can comprise a reading unit, a data processing unit and/or a transmission unit, which respectively have an embodiment as described in relation to the hair salon chair according to the invention.

Additionally, the use according to the invention and the methods according to the invention can be transferred with appropriate adaptations to a bed.

In respect of evaluating an occupancy state of a bed, the control and/or regulation, as explained above in relation to the hair salon chair according to the invention, is predominantly in the foreground. As a consequence, it is possible to control or regulate the illuminance in the surroundings of the bed, caused by at least one light source, depending on the occupancy state of the bed; in particular, it is possible to switch said light source on or off. A corresponding statement applies to the luminous color, the wavelength(s), the temperature and the ventilation.

Moreover, information can be reproduced depending on the occupancy state of the bed. In particular, a television and/or a radio can be switched on in the case of a determined occupancy of the bed by one or more persons.

Further, a timer can be started or stopped if it is determined that the bed is occupied by one or more persons or unoccupied. The data from the timer then can be evaluated, for example, in respect of the sleep duration and the sleep rhythm.

The structures and principles explained above can also be transferred to a television chair. Typically, such a television chair has a seat, a backrest, two armrests and a base part.

Such a television chair has at least one sensor for qualitative and/or quantitative capture of a physical measurand indicating occupancy of the television chair by a person. Suitable physical measurands are represented by, e.g., pressure on the television chair caused by the person(s), a temperature change caused the person(s), the distance of the person(s) from the television chair, a pulse frequency of the person(s), a respiratory frequency of the person(s) and/or a change in a light beam caused by the person(s).

The at least one sensor can be embodied as explained above in relation to the hair salon chair according to the invention.

The sensor preferably is integrated into the television chair, in particular into a seat, a backrest, an armrest and/or a base part of the television chair.

Further, the television chair can comprise a reading unit, a data processing unit and/or a transmission unit, which respectively have an embodiment as described in relation to the hair salon chair according to the invention.

Additionally, the use according to the invention and the methods according to the invention can be transferred with appropriate adaptations to a television chair.

In respect of evaluating an occupancy state of a television chair, the control and/or regulation, as explained above in relation to the hair salon chair according to the invention, is predominantly in the foreground. As a consequence, it is possible to control or regulate the illuminance in the surroundings of the television chair, caused by at least one light source, depending on the occupancy state of the television chair; in particular it is possible to switch said light source on or off. A corresponding statement applies to the luminous color, the wavelength(s), the temperature and the ventilation.

Moreover, information can be reproduced depending on the occupancy state of the television chair. In particular, a television, a radio and/or further multimedia devices can be switched on in the case of a determined occupancy of the television chair by a person.

Further, a timer can be started or stopped if it is determined that the television chair is occupied by a person or unoccupied. The data from the timer then can be evaluated, for example, in respect of television consumption.

The structures and principles explained above can also be transferred to a restaurant chair. Typically, such a restaurant chair has a seat, a backrest and four legs.

Such a restaurant chair has at least one sensor for qualitative and/or quantitative capture of a physical measurand indicating occupancy of the restaurant chair by a person. Suitable physical measurands are represented by, e.g., pressure on the restaurant chair caused by the person(s), a temperature change caused the person(s), the distance of the person(s) from the restaurant chair, a pulse frequency of the person(s), a respiratory frequency of the person(s) and/or a change in a light beam caused by the person(s).

The at least one sensor can be embodied as explained above in relation to the hair salon chair according to the invention.

The sensor preferably is integrated into the restaurant chair, in particular into a seat, a backrest and/or a leg of the restaurant chair.

Further, the restaurant chair can comprise a reading unit, a data processing unit and/or a transmission unit, which respectively have an embodiment as described in relation to the hair salon chair according to the invention.

Additionally, the use according to the invention and the methods according to the invention can be transferred with appropriate adaptations to a restaurant chair.

In respect of evaluating an occupancy state of a restaurant chair, the control and/or regulation, as explained above in relation to the hair salon chair according to the invention, is predominantly in the foreground. As a consequence, it is possible to control or regulate the illuminance in the surroundings of the restaurant chair, caused by at least one light source, depending on the occupancy state of the restaurant chair; in particular, it is possible to switch said light source on or off. A corresponding statement applies to the luminous color, the wavelength(s), the temperature and the ventilation.

Moreover, information can be reproduced depending on the occupancy state of the restaurant chair. In particular, a television and/or a loudspeaker can be switched on in the case of a determined occupancy of the restaurant chair by a person.

Further, a timer can be started or stopped if it is determined that the restaurant chair is occupied by a person or unoccupied. The data from the timer then can be evaluated, for example, in respect of the occupancy of a restaurant.

The invention will be explained in more detail below on the basis of the description of preferred exemplary embodiments, in part with reference to the accompanying drawings. The above-described features and/or the features disclosed in the subsequent description can be combined with another where necessary, even if this is not expressly described in detail.

BRIEF DESCRIPTION OF THE DRAWINGS

FIG. 2 shows the chair of FIG. 1 in a room of a hair salon.

DETAILED DESCRIPTION OF THE INVENTION

Figure 1:
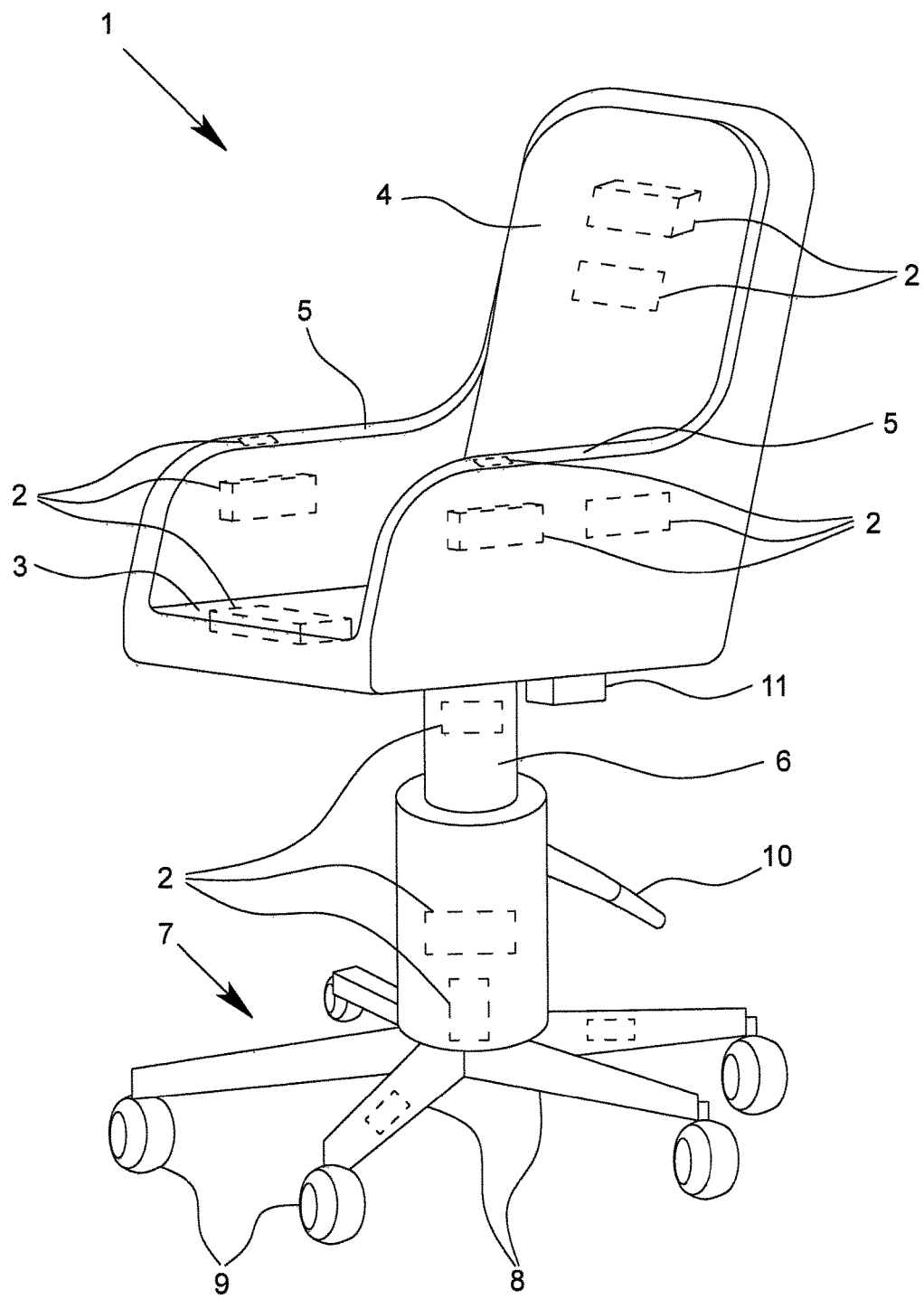
FIG. 1 is a schematic a perspective view of a preferred embodiment of a hair salon chair according to the invention.

FIG. 1 schematically shows a perspective view of a preferred embodiment of a hair salon chair 1 according to the invention. The hair salon chair 1 has a plurality of sensors 2 for qualitative and/or quantitative capture of a physical measurand indicating occupancy of the hair salon chair 1 by a person.

In the illustrated and preferred exemplary embodiment, the sensors 2 are embodied as piezoelectric pressure sensors for qualitative capture of a change in pressure on the hair salon chair 1 caused by the person.

Advantageously, the piezoelectric pressure sensors 2 are designed in such a way that they can capture a change in pressure caused by the body weight of the person, to be precise both of a child and of an adult, i.e., typically, in a body weight range from 5 kg to 200 kg.

The hair salon chair 1 has a seat 3, a backrest 4, two lateral armrests 5, a vertical column 6 and a cruciform base 7 having a plurality of arms 8, on which one roller 9 is fastened in each case. Further, the hair salon chair 1 has a lifting apparatus, not illustrated in any more detail, for height adjustment of the hair salon chair 1; however, such can be of any known construction, such as that of U.S. Pat. No. 6,015,130. The lifting apparatus can be actuated by means of a lever 10.

Proceeding from the seat 3, the backrest 4 extends upward substantially in the direction of the seat height, i.e., vertically in FIG. 1. The two armrests 5 are arranged laterally, to the left and right of the seat 3 and of the backrest 4 in FIG. 1. In this respect, the armrests 5 delimit the seat 3 in terms of its seat width.

The seat 3 and the backrest 4 can be connected to one another in a permanent manner and, in the process, can have an embodiment that is rigid or movable in relation to said parts. Preferably, the seat 3 and the backrest 4 are embodied in such a way that the inclination of the backrest 4 relation to the seat 3 is individually adjustable for a person. The seat 3 and the backrest 4 also can be embodied as an integral, solid overall structure.

A small selection of possible positions for the sensors 2 are indicated by dashed lines in the figures. Naturally, the sensors also can be arranged at different points on the hair salon chair 1.

In the illustrated and preferred exemplary embodiment, the sensors 2 are integrated into the hair salon chair 1, namely into the seat 3 of the hair salon chair 1. Preferably, the sensors 2 are arranged directly under a surface of the seat 3, wherein this surface in FIG. 1 delimits the seat 3 to the top and itself is delimited by the backrest 4 and the two armrests 5. This is advantageous, firstly, in that the sensors 2 are not visible and cannot be touched when the hair salon chair 1 is used. Secondly, an integration of the sensors 2 into the seat 3, in particular under said surface of the seat 3, ensures a reliable capture of a change in pressure caused by the person on the hair salon chair 1. This is because, typically, when the hair salon chair 1 is occupied, the seat 3 is continuously exposed to pressure by the person while the backrest 4 and/or the armrests 5 could not be exposed, or not continuously be exposed, to pressure by the person. Arranging the sensors 2 under said surface of the seat 3 is furthermore advantageous in that a pressure exerted on the seat 3 at these positions is less damped than, for example, in the vertical column 6 or in the cruciform base 7.

The sensors 2 already can be integrated into the seat 3 during the production of the hair salon chair 1. However, the sensors 2 also subsequently can be retrofitted into an already available hair salon chair 1. To this end, the seat 3 can be opened (e.g., at the seam) and sealed again after arranging the sensors 2 in the seat 3 and connecting said sensors to further components of the hair salon chair 1.

In the illustrated and preferred embodiment, the hair salon chair 1 is embodied for processing, in particular for amplifying, converting, evaluating, encoding and/or packetizing, signals produced by the sensors 2. To this end, the hair salon chair 1 has one or more electronic circuits (not illustrated in FIG. 1), for example, an operational amplifier and/or a signal processor. There is a suitable signal processing by means of the electronic circuits.

Optionally, the hair salon chair 1 may have a data processing unit (not illustrated), which is embodied to determine an occupancy state of the hair salon chair 1 on the basis of the signals produced by the sensors 2 and to create an occupancy state signal.

In the illustrated and preferred embodiment, the hair salon chair 1 has a transmission unit (not illustrated), which preferably is housed in a control box 11. The transmission unit of the hair salon chair 1 is embodied to receive signals that are produced by the sensors 2 and processed by the hair salon chair 1 and/or an occupancy state signal from the data processing unit and to wirelessly transmit a signal. The transmission unit thus can receive signals from the sensors 2, extract information therefrom, and bring this information in its original or a derived form into a wirelessly transmittable signal and transmit the signal by means of wireless technology. Here, Bluetooth is used as wireless technology.

In particular, the transmission unit of the hair salon chair 1 can receive signals that are produced by the sensors 2 and processed by the hair salon chair 1, correspondingly process said signals and wirelessly transmit signals produced therefrom. A corresponding statement applies to the occupancy state of the data processing unit. A wirelessly transmitted signal from the transmission unit of the hair salon chair 1 also may comprise an address of the hair salon chair 1, an error code, and/or information about the state of an energy store of the hair salon chair 1.

Like the transmission unit, one or more energy stores and/or further electronic circuits of the hair salon chair 1, the optional data processing unit of the hair salon chair 1 can be housed in the control box 11. The control box 11 preferably is arranged on a lower side of the seat 3 of the hair salon chair 1. This facilitates comfortable retrofitting and/or interchanging of the control box 11, together with the electronic circuits and energy stores situated therein.

The illustrated embodiment of the hair salon chair 1 only represents one variant, albeit a preferred variant, of a hair salon chair 1 according to the invention.

According to a preferred embodiment of the first method according to the invention, it is possible to proceed as described below for the purposes of evaluating an occupancy state of the hair salon chair 1.

First, the change in pressure caused by a person when sitting down or standing is captured by means of the piezoelectric pressure sensor 2 in the case of an occurrence of a change in pressure on the seat 3 of the hair salon chair 1. If a change in pressure is captured by the sensors 2, electric charges are generated by the sensors 2, said electric charges respectively leading to an output signal of the sensors 2. These output signals of the sensors 2 are processed by one or more electronic circuits of the hair salon chair 1. Subsequently, the processed signals are guided to the transmission unit of the hair salon chair 1, and are received and processed further by the latter. During the further processing, the transmission unit creates an output signal which contains information about the output signal of the sensors 2, an address of the hair salon chair 1, optionally an error code and/or optionally information about the state of an energy store of the hair salon chair 1. The output signal of the transmission unit is transmitted wirelessly to a reception unit 13 outside of the hair salon chair 1 in another part of a hair salon room 12. After the transmitted signal has been received by the reception unit 13, the transmitted signal is processed further.

Now, an occupancy state of the hair salon chair 1 is determined on the basis of the further-processed signal, to be precise by means of a data processing unit that is connected to the reception unit 13. Finally, the determined occupancy state is evaluated.

Here, the evaluation of the occupancy state comprises the control of at least one light source in the vicinity of the hair salon chair 1. The light source (or light sources) can be, e.g., arranged on a mirror 14 assigned to the hair salon chair 1 and/or over the hair salon chair 1. Preferably, the illuminance, luminous color or color temperature caused by the light source and/or the wavelength (or wavelengths) emitted by the light source are adapted. By way of example, if the hair salon chair 1 is occupied by the person, i.e., if the person sits down on the seat 3 of the hair salon chair 1, the light source can be switched on or the brightness of the light source can be increased or the color temperature can be changed from warm light to cold light.

Accordingly, the light source can be switched off or the brightness thereof can be reduced or the color temperature can be changed from cold light to warm light when the person gets up from the hair salon chair 1.

The hair salon chair 1 typically is situated in a room 12 of a hair salon. A heating apparatus and/or ventilation apparatus usually is provided in the room 12. According to the preferred embodiment of the first method according to the invention, the evaluation of the occupancy state comprises the regulation of the prevalent temperature in the room 12 by means of the temperature apparatus and/or the regulation of the ventilation by means of the ventilation apparatus, depending on the occupancy state.

In the preferred embodiment, advertisement is displayed on mirror 14, or on a portion thereof, assigned to the hair salon chair 1 if occupancy of the hair salon chair 1 by a person is determined. After the person stands up, the display of the advertisement on or in the mirror 14 is stopped.

Moreover, a timer is started if it is determined that the hair salon chair 1 is occupied by a person. This timer is stopped as soon as it is determined that the hair salon chair 1 is no longer occupied. If the measured value of the timer exceeds a predetermined threshold, a notification or an alarm is generated automatically.

With the aid of the values measured by the timer, it is further possible to ascertain a utilization of the hair salon chair 1, with, in this case, the values of the timer being considered over a certain time interval.

In the preferred embodiment, a notification is automatically sent to a cash register system if it is determined that the hair salon chair 1 has changed from an occupied state to an unoccupied state. On the basis of this message, a team member or the person who previously occupied the hair salon chair 1 can be reminded about a payment process.

Moreover, the hair salon chair 1 is assigned to mirror 14 on the basis of the transmitted address of the hair salon chair 1 in the preferred embodiment.

According to a preferred embodiment of a hair salon according to the invention, the latter has a plurality of hair salon chairs 1, which are configured according to the previously explained preferred embodiment of the hair salon chair 1 according to the invention.

The hair salon moreover has a reception unit 13 for receiving wireless signals from the hair salon chairs 1, a plurality of mirrors, wherein respectively one mirror 14 is assigned to a hair salon chair 1, a data processing unit, a cash register system and a seat allocation system for allocating a person to one of the hair salon chairs 1.

The invention claimed is:

1. A method for evaluating an occupancy state of a chair, wherein the method comprises at least the following method steps:

using at least one first sensor to at least one of qualitatively and quantitatively capturing a first physical measurand indicating occupancy of the chair by a person due to at least one of pressure on the chair caused by the person, a temperature change caused by the person, a distance between the person and the chair, a pulse rate of the person, a respiratory rate of the person and a change in a light beam caused by the person, processing a signal produced by the at least one first sensor, receiving and further processing of the processed signal by a transmission unit of the chair, wirelessly transmitting the further processed signal by means of the transmission unit to a reception unit separate and apart from the chair, the further processed signal containing at least one of an identifier that identifies the person and an address of the chair, further processing the transmitted signal, determining an occupancy state of the chair on the basis of the further processed signal by means of a data processing unit separate and apart from the chair and connected to the reception unit, and evaluating the determined occupancy state, wherein the method further comprises assigning the chair to a mirror on the basis of the address of the chair.

2. A method for evaluating an occupancy state of a chair, wherein the method comprises at least the following method steps:

at least one of qualitatively and quantitatively capturing a first physical measurand indicating occupancy of the chair by a person due to at least one of pressure on the chair caused by the person, a temperature change caused by the person, the distance between the person and the chair, a pulse rate of the person, a respiratory rate of the person and a change in a light beam caused by the person, by means of at least one first sensor, processing a signal produced by the first sensor, determining an occupancy state of the chair on the basis of the processed signal and creating an occupancy state signal by means of a data processing unit of the chair, receiving and further processing of the occupancy state signal by a transmission unit of the chair, wirelessly transmitting the further processed signal by means of the transmission unit to a reception unit outside of the chair, further processing of the transmitted signal, reading an occupancy state of the chair from the further processed transmitted signal, and evaluating the occupancy state read, wherein evaluating the occupancy state comprises controlling or regulating at least one of:

a luminous color or color temperature caused by at least one light source, a wavelength of light emitted by at least one light source, a temperature in at least one portion of a space in which the chair is situated, and ventilation in at least one portion of a space in which the chair is situated,
reproducing of information,
starting or stopping a timer,
determining utilization of the chair within a predetermined period of time and monitoring a payment process by the person.

3. A method for evaluating an occupancy state of a chair, wherein the method comprises at least the following method steps:
- at least one of qualitatively and quantitatively capturing a first physical measurand indicating occupancy of the chair by a person due to at least one of pressure on the chair caused by the person, a temperature change caused by the person, the distance between the person and the chair, a pulse rate of the person, a respiratory rate of the person and a change in a light beam caused by the person, by means of at least one first sensor,
- processing a signal produced by the first sensor,
- determining an occupancy state of the chair on the basis of the processed signal and creating an occupancy state signal by means of a data processing unit of the chair,
- receiving and further processing of the occupancy state signal by a transmission unit of the chair,
- wirelessly transmitting the further processed signal by means of the transmission unit to a reception unit,
- further processing of the transmitted signal,
- reading an occupancy state of the chair from the further processed transmitted signal, and
- evaluating the occupancy state read, wherein the method further comprises assigning the chair to a mirror on the basis of an address of the chair.

4. A hair salon monitoring system, comprising:
- at least one hair salon chair having at least one sensor for at least one of qualitative and quantitative capture of a physical measurand indicating occupancy of the at least one hair salon chair by a person, at least one transponder that identifies the person, at least one reading unit which is able to read an identifier from the transponder that identifies the person, and a transmission unit for receiving, and transmitting signals received from the at least one sensor and the at least one reading unit,
- at least one mirror,
- at least one reception unit separate and apart from the at least one hair salon chair for receiving wireless signals from the transmission unit of the at least one hair salon chair, and
- a data processing unit separate and apart from said at least one hair salon chair and connected to the reception unit for evaluating signals received from the transmission unit,
- wherein the data processing unit assigns the at least one mirror to the at least one hair salon chair on the basis of a transmitted address of the at least one hair salon chair, and
- wherein the data processing unit is operable for displaying information relating to the identified person occupying the hair salon chair on the mirror in front of which the hair salon chair is situated.

* * * * *